US011087270B1

(12) United States Patent
Foster (10) Patent No.: US 11,087,270 B1
(45) Date of Patent: Aug. 10, 2021

(54) INDEXING VIDEO FOR RETAIL INVESTIGATIONS

(71) Applicant: Target Brands, Inc., Minneapolis, MN (US)

(72) Inventor: Robert F. Foster, Ramsey, MN (US)

(73) Assignee: Target Brands, Inc., Minneapolis, MN (US)

(*) Notice: Subject to any disclaimer, the term of this patent is extended or adjusted under 35 U.S.C. 154(b) by 664 days.

(21) Appl. No.: 14/831,364

(22) Filed: Aug. 20, 2015

(51) Int. Cl.
| G06Q 10/08 | (2012.01) |
| G06F 3/0482 | (2013.01) |
| G06F 3/0484 | (2013.01) |
| G08B 13/24 | (2006.01) |
| G06F 16/955 | (2019.01) |
| G06F 16/78 | (2019.01) |

(52) U.S. Cl.
CPC ......... *G06Q 10/087* (2013.01); *G06F 3/0482* (2013.01); *G06F 3/04842* (2013.01); *G06F 16/7867* (2019.01); *G06F 16/9554* (2019.01); *G08B 13/2402* (2013.01)

(58) Field of Classification Search
CPC .............. G06Q 10/087; G08B 13/2402; G06F 3/0482; G06F 3/04842; G06F 16/7867; G06F 16/9554
See application file for complete search history.

(56) References Cited

U.S. PATENT DOCUMENTS

| 7,298,264 | B1 | 11/2007 | Kuzma et al. | |
| 7,920,063 | B2* | 4/2011 | Ulrich | G06Q 20/208 |
| | | | | 235/385 |
| 8,334,775 | B2* | 12/2012 | Tapp | G08B 13/19697 |
| | | | | 235/375 |
| 9,210,365 | B2* | 12/2015 | Kreiner | G01S 13/82 |
| 2001/0000019 | A1 | 3/2001 | Bowers et al. | |
| 2002/0113123 | A1 | 8/2002 | Otto et al. | |
| 2004/0111335 | A1 | 6/2004 | Black et al. | |
| 2007/0159298 | A1 | 7/2007 | Zegelin et al. | |
| 2008/0088417 | A1 | 4/2008 | Smith et al. | |
| 2008/0128498 | A1 | 6/2008 | Fausak et al. | |
| 2008/0309491 | A1 | 12/2008 | Gillard et al. | |
| 2010/0148934 | A1 | 6/2010 | Nasser | |
| 2011/0087559 | A1* | 4/2011 | Paul | G06Q 30/0635 |
| | | | | 705/26.81 |
| 2013/0144757 | A1* | 6/2013 | Bauer | G06K 7/0008 |
| | | | | 705/26.61 |
| 2013/0182114 | A1* | 7/2013 | Zhang | H04N 7/18 |
| | | | | 348/150 |
| 2016/0247116 | A1* | 8/2016 | Olivo | G06Q 10/087 |

* cited by examiner

*Primary Examiner* — Allen C Chein
*Assistant Examiner* — Denisse Y Ortiz Roman
(74) *Attorney, Agent, or Firm* — Theodore M. Magee; Westman, Champlin & Koehler, P.A.

(57) ABSTRACT

A limited number of items are identified as high-theft items and RFID tags are added to only units of high-theft items. At periodic times during a day, a mobile scanner is taken to each area of a store that contains high-theft items and the mobile scanner is used to read signals from the RFID tags of only the units of high-theft items and thereby generate a periodic inventory count of the high-theft items. The periodic inventory counts for each high-theft item are then electronically stored.

12 Claims, 6 Drawing Sheets

STORE ID: minn-888
PRODUCT NAME: gum
PRODUCT ID: g-99099
STORE AREA: CANDY    CAMERA ID: CAN-03

| TIME/DATE OF COUNT | | COUNT | EXPECTED COUNT | NO. MISSING | VIDEO LINK |
|---|---|---|---|---|---|
| 2015-07-15 | 14:25:33 | 0 | 13 | 13 | CAN-03-2014-07-15-09:40:26 |
| 2015-07-15 | 09:40:26 | 1 | 14 | 13 | CAN-03-2014-07-14-14:01:10 |
| 2015-07-14 | 14:01:10 | 12 | 14 | 2 | CAN-03-2014-07-14-09:50:45 |
| 2015-07-14 | 09:50:45 | 15 | 17 | 2 | CAN-03-2014-07-13-18:12:22 |
| 2015-07-13 | 18:12:22 | 17 | 18 | 1 | CAN-03-2014-07-13-12:20:04 |
| 2015-07-13 | 12:20:04 | 19 | 19 | 0 | CAN-03-2014-07-13-09:02:15 |
| 2015-07-13 | 09:02:15 | 20 | 20 | 0 | CAN-03-2014-07-12-18:04:02 |

INDEXING VIDEO FOR RETAIL INVESTIGATIONS

BACKGROUND

In retail stores, security cameras are used to capture and store large volumes of video data that can be used to identify shoplifters. For large retailers who have a large number of stores, a huge quantity of video is recorded each day. The amount of data is so large that it is not possible to review all of the video data from all of the stores in a cost effective manner.

The discussion above is merely provided for general background information and is not intended to be used as an aid in determining the scope of the claimed subject matter. The claimed subject matter is not limited to implementations that solve any or all disadvantages noted in the background.

SUMMARY

A limited number of items are identified as high-theft items and RFID tags are added to only units of high-theft items. At periodic times during a day, a mobile scanner is taken to each area of a store that contains high-theft items and the mobile scanner is used to read signals from the RFID tags of only the units of high-theft items and thereby generate a periodic inventory count of the high-theft items. The periodic inventory counts for each high-theft item are then electronically stored.

In a further embodiment, a computer-readable medium having computer-executable instructions stored thereon is provided. The instructions cause a processor to perform steps of receiving a count of a number of units of an item based on RFID signals sent by a plurality of RFID tags to a mobile RFID reader. The count, a time of day of the count and a date of the count are stored. An expected number of units of the product that should be in a store is received. A user interface is then generated showing a plurality of counts of the number of units of the item, each count shown with a respective time of day of the count, a date of the count and at least one of an expected number of units that should have been in the store at the time of the count and a number of units missing at the time of the count. The user interface further indicates information that can be used to locate video data from a camera.

In a still further embodiment, a computer-implemented method includes receiving periodic counts in a day of the number of units of each of a limited set of items as determined by a mobile RFID reader. A user interface is generated for each item in the limited set of items, each user interface displaying a plurality of the periodic counts for the respective item, and information sufficient to identify a camera that captures views of the respective item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In accordance with several embodiments, a system is provided that allows investigators in an investigation center to quickly identify video segments that need to be reviewed to identify thieves of certain high-theft items. In the embodiments, RFID tags are added to selected high-theft items, also referred to as products, in a retail store. Using a mobile RFID reader, employees of the retail store periodically visit the areas where each of the high-theft items are kept so that the system can quickly count the number of units of the items through the RFID reader. A user interface is provided that shows the counts determined at various times and dates. The user interface also identifies a camera that captured video of the area where the item was located. This permits an investigator to quickly locate video showing the area during times when the count of the product drops suspiciously.

Figure 1:
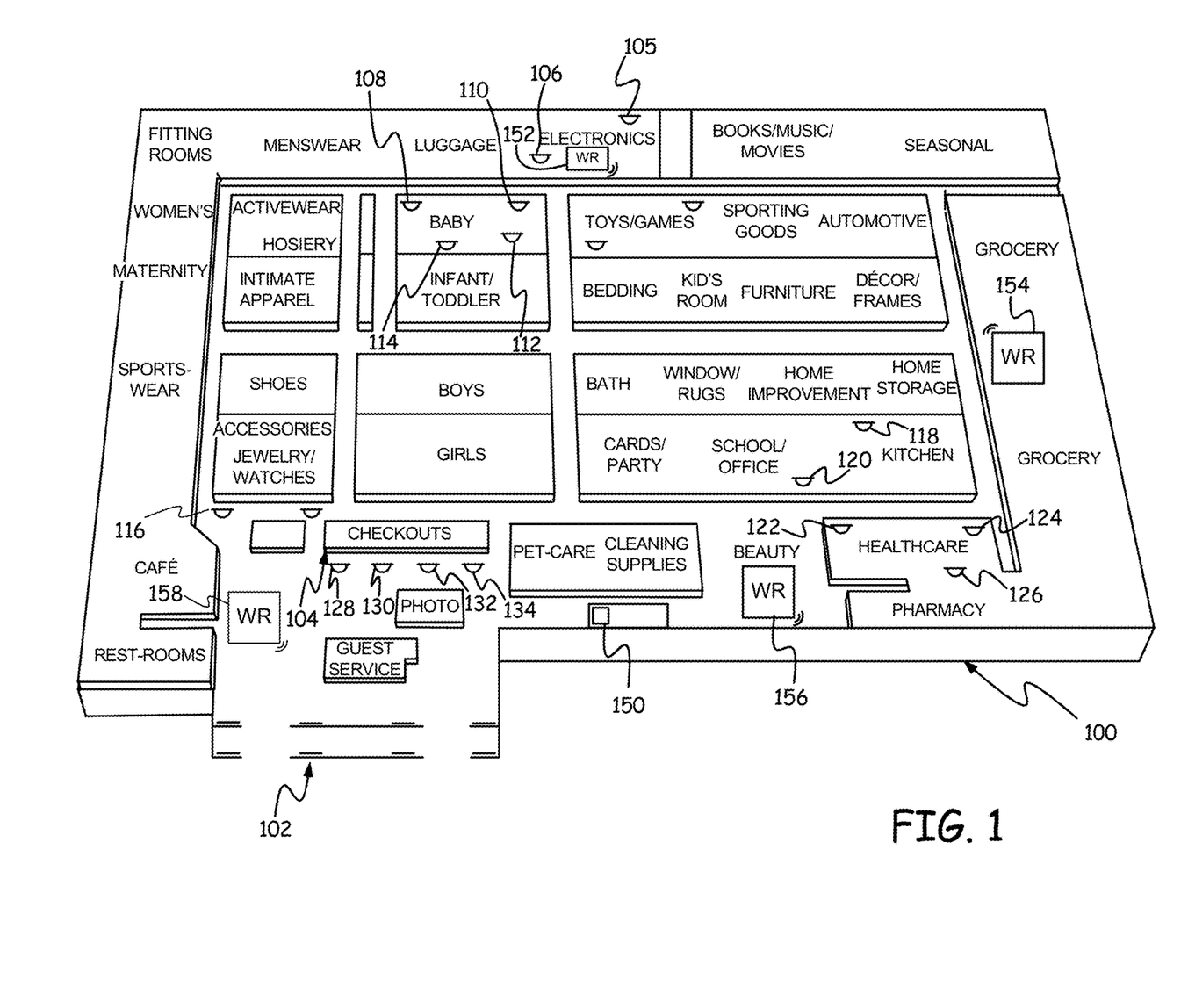
FIG. 1 provides a store layout for an exemplary store.

FIG. 1 provides a plan view of a retail store 100 showing the various departments of the store. Retail store 100 includes entrances 102 and checkout lanes 104 that contain point-of-sale registers where customers can purchase products. Throughout store 100, various cameras, such as cameras 105, 106, 108, 110, 112, 114, 116, 118, 120, 122, 124, 126, 128, 130, 132 and 134, for example, capture images of areas where items are positioned for sale. The cameras shown in FIG. 1 are only a small sampling of the total number of cameras in the retail store. The various cameras in the retail store are connected together in a local area computing network to a store server 150, which collects the video data and either stores the video data locally within the retail store or transmits the video data to a remote database through a network connection. Store 100 also includes a plurality of wireless routers such as wireless routers 152, 154, 156 and 158, which can communicate with hand held devices such a mobile barcode/RFID readers.

Figure 2:
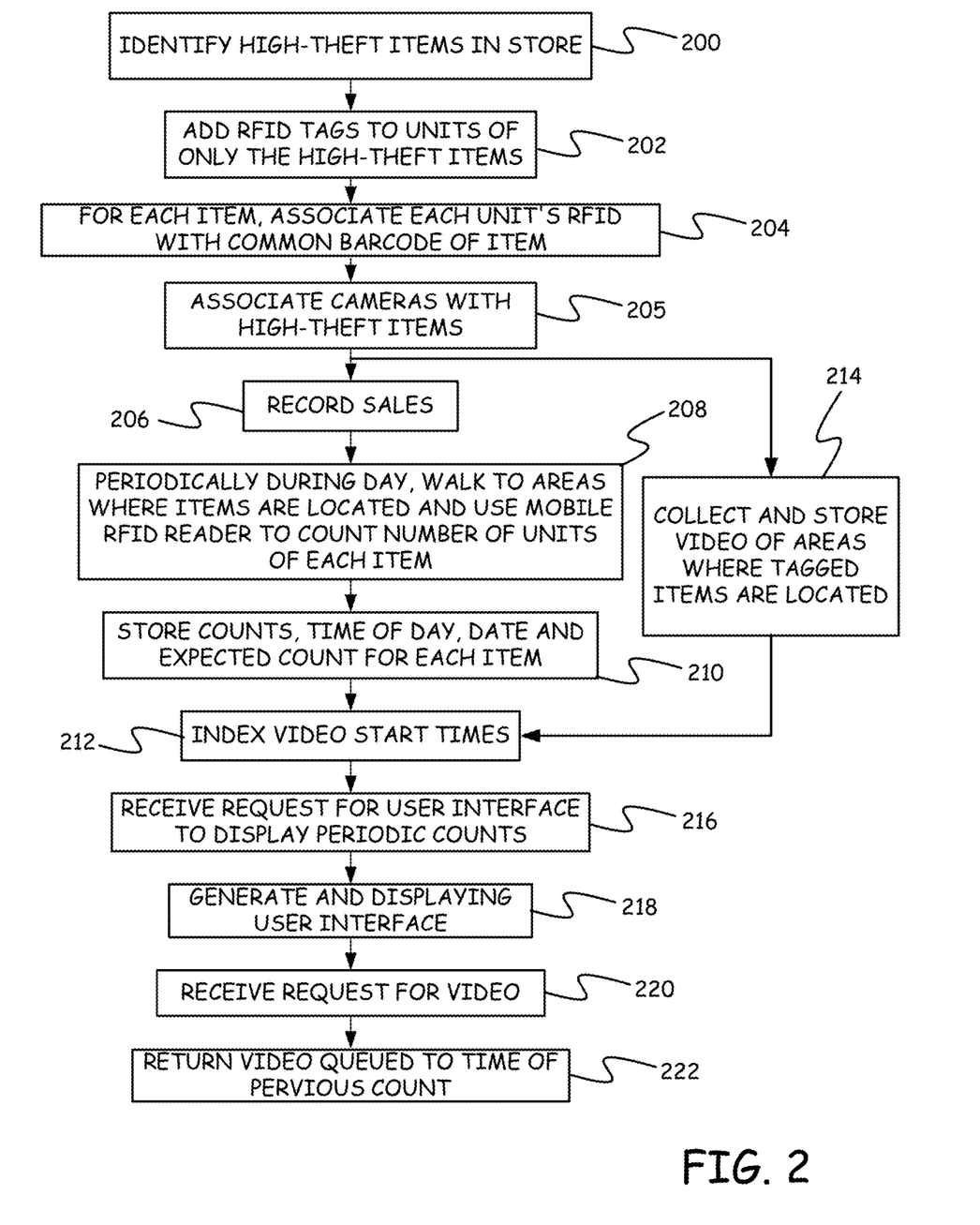
FIG. 2 provides a flow diagram of a method in accordance with one embodiment.

FIG. 2 provides a flow diagram of a method in accordance with one embodiment. In step 200, high-theft items in a store are identified. These items may be identified at the store level by the manager of the store or at the enterprise level by security personnel for multiple stores. In some embodiments, some of the high-theft items are identified by the stores and some of the items are identified by security personnel for the enterprise. Identifying high-theft items in the store involves identifying only a limited number of items in the store. For example, in some embodiments, 60 items are identified for an entire store. By identifying only a limited number of high-theft items, the processing load on the severs for the enterprise are reduced since video data does not have to be stored and indexed for a large number of items. Further, identifying a limited number of high-theft items reduces the labor costs associated with adding RFID tags to items and carrying an RFID reader to different areas of the store, as described further below.

Figure 3:
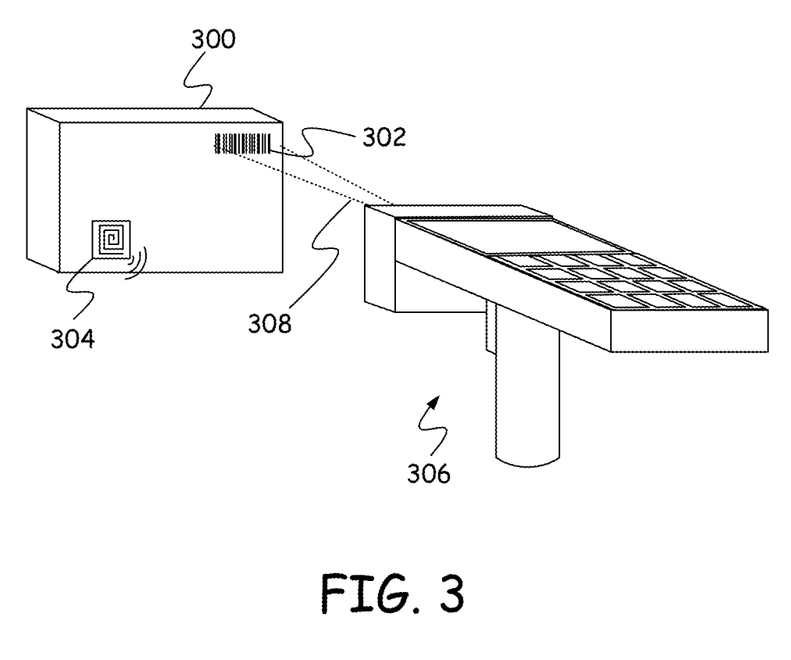
FIG. 3 provides a perspective view of a RFID tag that has been added to a product and a combination barcode scanner and RFID tag reader.

At step 202, RFID tags are added to units of only the high-theft items. FIG. 3 provides an example of an item 300, which has an RFID tag 304 added to it. In the embodiment of FIG. 3, the RFID tag 304 is an adhesive sticker that includes metal traces and electronic components that allow RFID tag 304 to receive an interrogation signal from an RFID reader, process the signal and transmit a response. In some embodiments, RFID tag 304 includes a limited power source such as a battery. In other embodiments, RFID tag 304 is completely powered by the interrogation signal it receives. The RFID tags are only added to units of the high-theft items and not to all items in a store. This reduces the labor costs associated with adding RFID tags and reduces the cost of implementation by reducing the total number of RFID tags necessary.

At step 204, for each item, the RFID tags added to the units of the item are associated with a common barcode of the item. For example, in FIG. 3, item 300 includes a barcode 302 that is common to every unit of that item. In other words, barcode 302 is found on every unit of that item. In step 204, reader 306 is used to scan barcode 302 and to receive an RFID signal from RFID tag 304. To scan barcode 302, mobile reader 306 emits a scan beam 308 and detects the resulting reflected light from barcode 302. The received RFID signal includes an identifier for the RFID tag that is unique to unit 300 of the item. In step 204, the unique identifier returned by RFID tag 304 is associated with the common barcode represented by barcode 302. Thus, there is a one-to-many relationships between the barcode and the RFID tags of the units.

Figure 4:
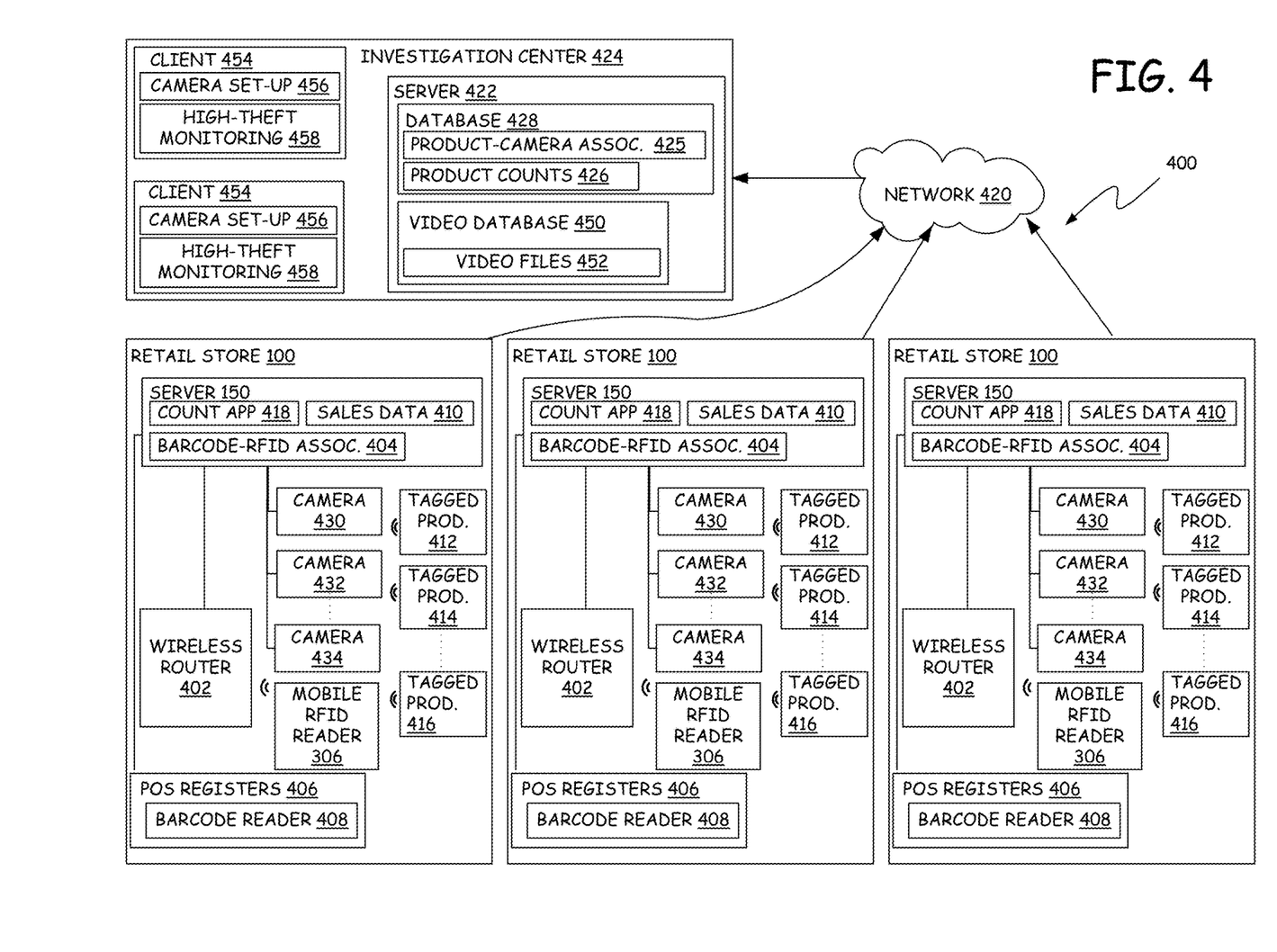
FIG. 4 provides a block diagram of a system in accordance with one embodiment.

FIG. 4 provides a block diagram of a system 400 that is used in the method of FIG. 2. In FIG. 4, a plurality of retail stores 100 and an investigation center 424 form part of a retail enterprise. Servers 150 within each retail store communicate with a server 422 in the investigation center through a network 420.

In FIG. 4, mobile RFID reader 306 in a retail store 100 is shown communicating with a wireless router 402, which for example can be any one of the wireless routers shown in FIG. 1, such as wireless router 156. Wireless router 402 is in communication with server 150. Through the connection to wireless router 402 and server 150, mobile RFID reader 306 provides the barcode received by scanning barcode 302 and the RFID received from RFID tag 304 for unit 300. This information is stored by sever 150 as barcode-RFID association 404 for the unit.

After the RFID tags have been associated with the common barcode at step 204, an investigator or administrator associates one or more cameras with each high-theft item at step 205. In accordance with one embodiment, cameras are associated with high-theft items using a camera setup application 456 executed by one of a plurality of client devices 454 that can communicate with server 422 of investigation center 424. Client devices 454 can be located within investigation center 424 or can be remote from investigation center 424. The camera(s) associated with a high-theft item are cameras that capture video of the area of the store containing the high-theft item. Camera setup 456 is used to associate at least one camera with each high-theft item in each retail store 100 in the retail enterprise. The camera associated with each item is stored in product-camera associations 425 in a database 428 of server 422.

After cameras have been associated with the high-theft items, customers are allowed to purchase units of the high-theft items. When a user purchases a unit of an item, a barcode reader 408 of a point-of-sale register 406 reads barcode 302 on the unit and uses the barcode to retrieve the price of the item and a description of the item. The price and description may be stored within point-of-sale register 406 or within server 150. When the transaction is completed, the identity of the product is forwarded to server 150 and server 150 updates sales data 410 to indicate that a unit of the high-theft item was sold.

At step 208, periodically during the day, one or more employees walk to areas where high-theft items are located and use mobile RFID reader 306 to read the RFID signals emitted by the units of the items. For example, in FIG. 4, tagged products 412, 414 and 416 provide radio signals to mobile RFID reader 306, which indicate the radio frequency identifier of each of the tagged products. Mobile RFID reader 306 forwards the RFID values to server 150 through wireless router 402. The RFID values are provided to a count application 418, which compares the RFID values against barcode-RFID associations 404. The received RFIDs that are for a common barcode are counted by count application 418 to form a product count for the product/item.

At step 210, count application 418 forwards the counts for each high-theft item through network 420 to server 422 in investigation center 424. Server 422 stores the product counts as product counts 426 in database 428. When forwarding the counts, count application 418 includes the date and time that mobile RFID reader 306 provided the RFID values for the item. This date and time is stored in product counts 426 for each item as the date and time that the product count was performed. In addition to sending the counts and the date and time that the counts were performed, count application 418 also accesses sales data 410 to determine how many units of each item have been sold since the last count of the item. The number of units sold in that period of time is subtracted from a previous expected count of the item to form a new expected count for the item. The expected count of an item is the number of units of an item that should be present in the store if no items were damaged, stolen or otherwise missing. Count application 418 forwards the new expected count to server 422 where it is stored as part of product counts 426 for this count of the item. Thus, each count of an item includes the number of units of the item counted by mobile RFID reader 306, the date and time that the RFID reader received the RFID signals and the expected count of the items at the item the RFID reader received the RFID signals.

In between counts of the items, video cameras, such as camera 430, 432 and 434 collect video of the areas where the tagged items, such as tagged products 412, 414, and 416, are located at step 214. When a new count for an item is determined, count application 418 sets a marker that represents the frame of video captured during the count of the item. This marker may be saved as a database entry that identifies the video file and frame within the video file when the count occurred or alternatively, may be created by segmenting the video file into smaller video files with each smaller video file extending from when one count of the tagged product was performed until just before the next count of the tagged product was performed. The video segments or the video files and separate markers are transferred by count application 418 through network 420 to server 422 where they are stored in video database 450 as video files 452. In storing the video files in video database 450, the video files are indexed by the store, item, store area and/or camera id, and the date and time of the product count(s) shown in the videos. The date and time of the product counts can be the date and time of the product count at the beginning of the video, the date and time of the product count at the end of the video, or a range of dates and times that span multiple counts. If the video files have not been divided up into segments, the video files will include one video file and a marker file indicating frames within the video file when product counts were performed and the date and time those product counts were performed.

An investigator can use a high-theft monitoring application 588 in client devices 454 to review product counts for high-theft items in any of the stores of the enterprise. In particular, high-theft monitoring application 588 can be used to request a user interface that provides counts for a particular high-theft item in a particular high-theft store and that provides access to video segments that cover the period before each count.

At step 216, high-theft monitoring application 458 sends a request for a user interface to display periodic counts of a product. This request is received by server 424, which in turn generates and returns the user interface to high-theft monitoring application 458 at step 218. High-theft monitory application 458 then displays the user interface on a display on client device 454.

Figure 5:
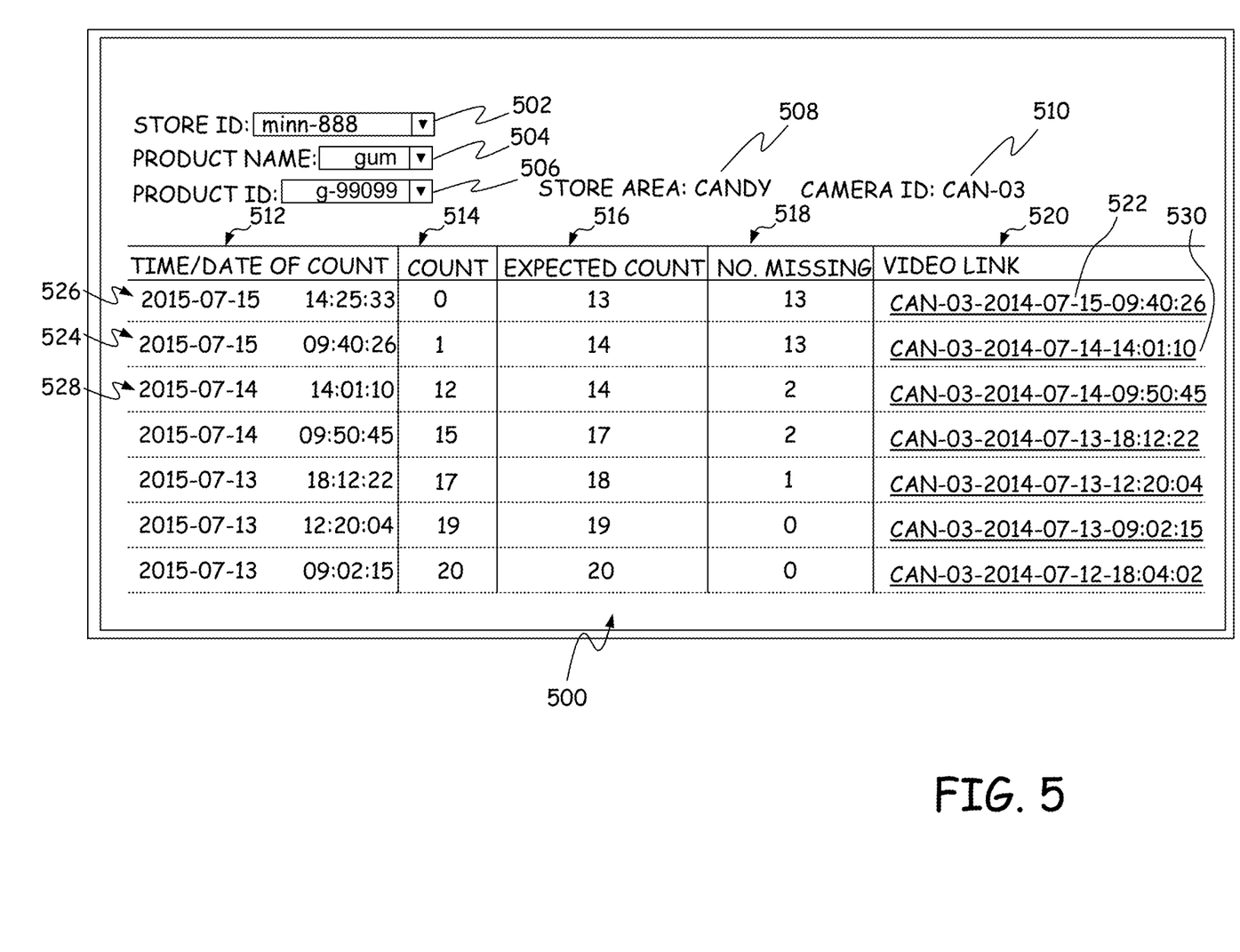
FIG. 5 provides an example of a user interface in accordance with one embodiment
FIG. 6 provides a block diagram of a computing device that may be used in the various embodiments.

FIG. 5 provides an example of user interface 500 that is generated and returned at step 218 for a product. User interface 500 includes a store selection box 502 that accepts a store ID to identify one of retail stores 100. A product name selection box 504 and a product ID box 506 allow an investigator to select a particular high-theft item identified for the store set in store ID 502. Since different retail stores can have different high-theft items, the store ID must be populated before the product name and product ID can be selected since the product name and product ID fields are dynamically populated by server 422, based on records in database 428 for the selected store ID. Upon the selection of the product name or product ID, a store area 508 and a camera ID 510 associated with the selected product are automatically populated in user interface 500 based on product-camera associations 425 in database 428. Server 422 then performs a search of database 428 for the last K product counts in products counts 426 for the selected product. The number of product counts selected, K, can be defined in high-theft monitoring application 458. In accordance with on embodiment, the product counts are retrieved in time/date order with the last count to be performed listed at the top of the user interface and the first count that was performed at the bottom of the user interface.

User interface 500 includes a time/date of count column 512, a count column 514, an expected count column 516, a number missing column 518 and a video link column 520. Time/date of count column 512 includes the time and date at which mobile RFID reader 306 read the RFID signals from the tagged products. Count 514 represents the count of the number of units of the item determined from the RFID values returned by mobile RFID reader 306 at the count time. Expected count 516 represents the number of items expected to be on the shelf at the time of the count as determined by subtracting the number of sales since the last count from the expected count at the last count. Column 518 indicates the total number of missing units of an item, representing the difference between the count in column 514 and the expected count in column 526. Column 520 includes selectable links to video segments that span from the previous count to the current count. For example, when link 522 for count 526 is selected, high-theft monitoring application 458 sends a request for a video segment to server 422. At step 220, server 422 receives the request for the video segment and retrieves the video segment from video files 452. In particular, the link to the video file includes information used by server 422 to identify a video segment for the item and to identify the frame associated with the previous count of the item. If the periods between counts are each associated with separate video files, the proper video file is retrieved by server 422 and is returned at step 222. If a video file contains multiple counts, a marker file is consulted to identify the frame in the video file where the previous count occurred and to cause the video file to be returned queued to the time of the previous count at step 222. Within high-theft monitoring application 458, when a video file is returned, a video player window is opened, if necessary, and the video begins to play starting at the frame containing the previous count.

User interface 500, of FIG. 5 allows an investigator to quickly identify when a large number of units of an item went missing. For example, up through count 528, only two units of the item were missing. However, at count 524, 13 units were missing. This large increase in the number of missing units indicates that some event occurred between count 528 and count 524. As a result, the investigator can select video link 530 and thereby immediately retrieve the video of the area that holds the item and that spans the period between count 528 and 524. Since the investigator is able to immediately select the limited segment of the video they wish to view that contains the time when a large number of units went missing, the load on server 422 is greatly diminished since investigators are not requesting a large amount of video in order to discover what period during the week the units disappeared. By reducing the computational load on server 422, the present embodiments improve the operation of server 422 and allows server 422 to respond faster to requests from client devices 454.

Figure 6:
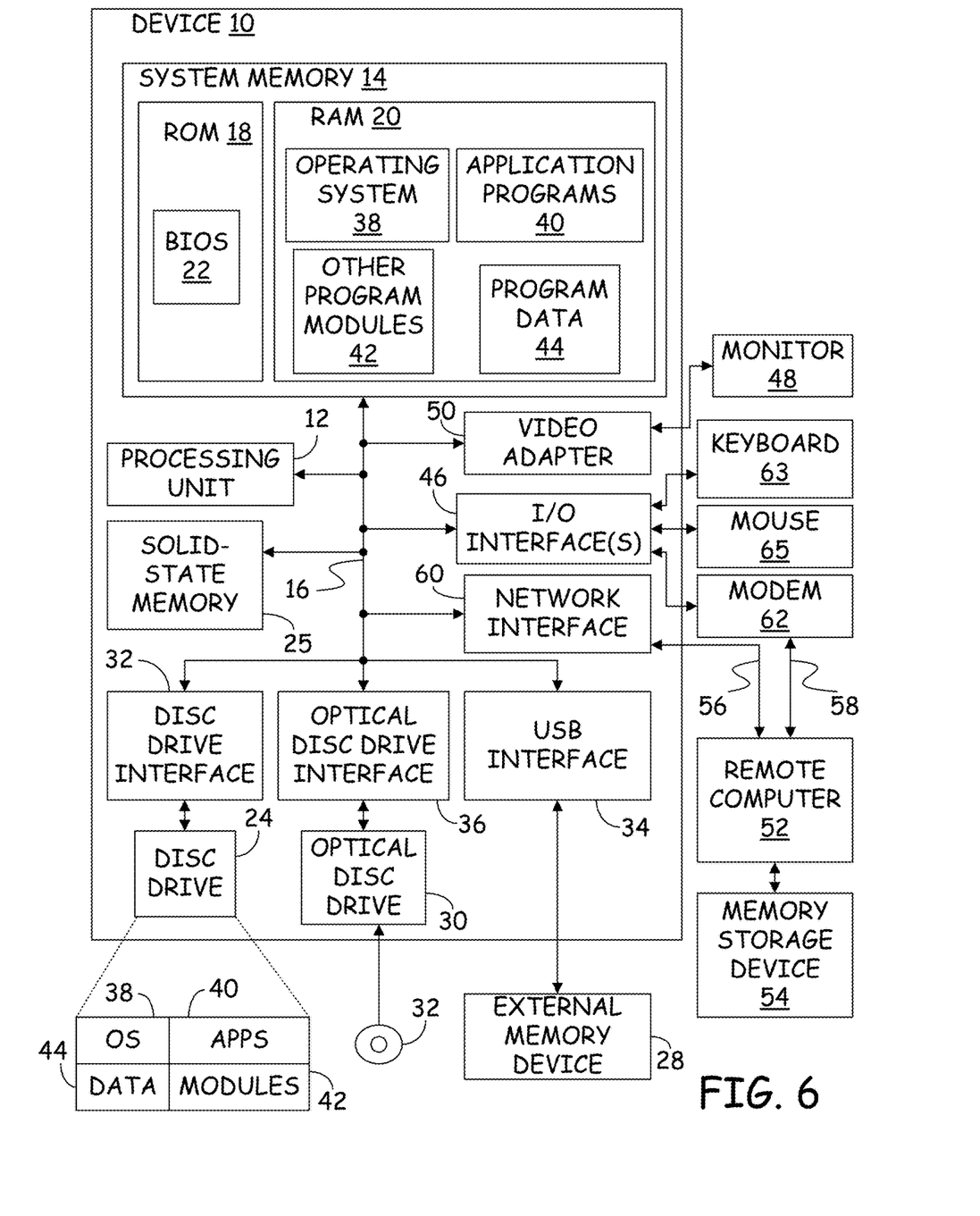

FIG. 6 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing server 114 including programs for implementing count application 418, camera set up 456, and high-theft monitoring 458, for example. Program data 44 may include data such as product-camera associations 425, product counts 426, video files 452, sales data 410, and barcode-RFID associations 404, for example.

Processing unit 12, also referred to as a processor, executes programs in system memory 14 and solid state memory 25 to perform the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The network connections depicted in FIG. 6 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
   at a plurality of times, receiving from a mobile RFID scanner a plurality of values based on signals from RFID tags on units of items located in an area of a store,
   for each of the plurality of times, generating a respective inventory count for each of the items from the received plurality of values;
   for each inventory count of each item:
      setting a marker that represents a frame of video of an area containing the item collected by a camera during the inventory count such that the marker is indexed by an identifier for a store, an identifier for the camera, and a date and time of the inventory count; and
      electronically storing the inventory count together with the date and time of the inventory count; and
   for a selected item wherein a unit of the selected item has a first RFID tag, generating a user interface showing a plurality of inventory counts, each inventory count having displayed therewith:
      a selectable link to a video segment, wherein when the selectable link is selected, the segment of video is retrieved and is automatically played and wherein the video segment spans from a previous inventory count to and ending at the inventory count associated with the selectable link and is of a store area containing the selected item such that the video segment contains images of the store area before the inventory count.

2. The method of claim 1 further comprising a computing device executing instructions to access sales records for an item and using the sales records to determine an expected number of the item expected to be in the store during each inventory count.

3. The method of claim 2 further comprising storing the expected number of the item for each inventory count.

4. The method of claim 3 wherein the user interface further shows the respective expected number of the item for each inventory count in the plurality of inventory counts.

5. The method of claim 2 wherein the RFID tags are associated with a bar code on the items.

6. The method of claim 4 wherein the user interface further lists the store area containing the item.

7. A computer-readable medium having computer-executable instructions stored thereon that cause a processor to perform steps comprising:
   receiving a count of a number of units of an item based on RFID signals sent by a plurality of RFID tags to a mobile RFID reader;
   storing the count, a time of day of the count and a date of the count;
   receiving an expected number of units of the product that should be in a store;
   generating a user interface showing a plurality of counts of the number of units of the item, each count shown with a respective time of day of the count, a date of the count, a selectable link to stored video of an area containing units of the item collected from a camera beginning at a previous count and ending at the count such that the stored video contains images of the area before the count and at least one of an expected number of units that should have been in the store at the time of the count and a number of units missing at the time of the count, wherein the selectable link contains information that can be used to locate and return the stored video.

8. The computer-readable medium of claim 7 wherein the user interface further indicates an identifier for the camera.

9. The computer-readable medium of claim 7 further comprising generating a user interface showing a plurality of counts for a plurality of items, wherein the plurality of counts are received for only those items previously identified as high-theft items.

10. A computer-implemented method comprising:
for a limited set of items in a store, receiving periodic counts in a day of the number of units of each of the items as determined by a mobile RFID reader, which receives a respective signal from a respective RFID tag on each unit; and
generating a user interface for each item in the limited set of items, each user interface displaying a plurality of the periodic counts for the respective item, and for each periodic count in the plurality of periodic counts the user interface for the item displaying a selectable link that includes information sufficient to locate, retrieve and start play of a file containing stored video starting at a time point when the mobile RFID reader was used to perform a first periodic count and ending at a time point when the mobile RFID reader was used to perform the periodic count displayed with the selectable link such that the stored video contains images captured before the periodic count.

11. The computer-implemented method of claim 10 wherein generating a user interface for each item further comprises displaying an expected number of units for each periodic count.

12. The computer-implemented method of claim 11 further comprising receiving a barcode associated with an item and associating the barcode with RFIDs for units of the item.

* * * * *